United States Patent
Shih

(10) Patent No.: US 10,849,138 B2
(45) Date of Patent: Nov. 24, 2020

(54) METHOD AND APPARATUS OF MULTIPLE SR (SCHEDULING REQUEST) CONFIGURATIONS IN A WIRELESS COMMUNICATION SYSTEM

(71) Applicant: ASUSTek Computer Inc., Taipei (TW)

(72) Inventor: Tun-Huai Shih, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 16/002,324

(22) Filed: Jun. 7, 2018

(65) Prior Publication Data

US 2018/0359766 A1     Dec. 13, 2018

Related U.S. Application Data

(60) Provisional application No. 62/516,801, filed on Jun. 8, 2017.

(51) Int. Cl.
    *H04L 12/28*     (2006.01)
    *H04W 72/12*     (2009.01)
    *H04W 72/04*     (2009.01)

(52) U.S. Cl.
    CPC ........ *H04W 72/12* (2013.01); *H04W 72/0413* (2013.01); *H04W 72/1284* (2013.01)

(58) Field of Classification Search
None
See application file for complete search history.

(56) References Cited

U.S. PATENT DOCUMENTS

2015/0312930 A1     10/2015     Han et al.

2016/0165633 A1*    6/2016    Ostergaard ........ H04W 72/1284
                                                   370/329

(Continued)

FOREIGN PATENT DOCUMENTS

EP          3094148          11/2016

OTHER PUBLICATIONS

Etsi 3gpp:"LTE; Evolved Universal Terrestrial Radio Access (E-UTRA); Medium Access Control (MAC) protocol specification (3GPP TS 36.321 version 13.5.0 Release 13)", Apr. 11, 2017 (Apr. 11, 2017), pp. 1-96, XP055501050, Retrieved from the Internet: URL:http://www.etsi.org/deliver/etsi_ts/136300_136399/136321/13.05.00_60/ts_136321v130500p.pdf [retrieved on Aug. 21, 2018].

(Continued)

*Primary Examiner* — Kwang B Yao
*Assistant Examiner* — Juvena W Loo
(74) *Attorney, Agent, or Firm* — Skaar Ulbrich Macari, P.A.

(57) ABSTRACT

A method and apparatus are disclosed from the perspective of a UE. In one embodiment, the method includes triggering a first SR by a first LCH, wherein the first LCH is associated with a first SR configuration. The method also includes triggering a second SR by a second LCH while the first SR is pending, wherein the second LCH is associated with a second SR configuration, and the first SR configuration and the second SR configuration are configured for the same serving cell. The method further includes using a first SR opportunity and a second SR opportunity to transmit SRs to a network node until the SRs are cancelled, wherein the first SR opportunity corresponds to the first SR configuration and the second SR opportunity corresponds to the second SR configuration.

18 Claims, 15 Drawing Sheets

(56) References Cited

U.S. PATENT DOCUMENTS

| | | | | |
|---|---|---|---|---|
| 2016/0345356 | A1 | 11/2016 | Lindoff et al. | |
| 2018/0049227 | A1* | 2/2018 | Moon | H04W 72/0446 |
| 2018/0199343 | A1* | 7/2018 | Deogun | H04L 5/00 |
| 2018/0279331 | A1* | 9/2018 | Shaheen | H04W 72/1205 |
| 2018/0279353 | A1* | 9/2018 | Shaheen | H04W 72/1284 |
| 2018/0317123 | A1* | 11/2018 | Chen | H04W 28/0278 |
| 2018/0324635 | A1* | 11/2018 | Babaei | H04W 28/0278 |
| 2018/0324832 | A1* | 11/2018 | He | H04W 72/1284 |
| 2018/0324844 | A1* | 11/2018 | Babaei | H04W 74/08 |
| 2018/0324867 | A1* | 11/2018 | Basu Mallick | H04W 72/1242 |
| 2018/0324872 | A1* | 11/2018 | Babaei | H04W 72/1284 |
| 2018/0352567 | A1* | 12/2018 | Ye | H04W 72/1284 |
| 2018/0359773 | A1* | 12/2018 | Tesanovic | H04W 72/1268 |
| 2019/0075579 | A1* | 3/2019 | Wang | H04W 72/1242 |
| 2019/0261310 | A1* | 8/2019 | Martin | H04W 68/02 |

OTHER PUBLICATIONS

European Search Report from corresponding EP Application No. 18176534.8, dated Nov. 22, 2018.
3GPP TSG-RAN WG2 #98 R2-1704573 Hangzhou, China, May 15-19, 2017.
3GPP TSG-RAN WG2 #98 R2-1704946 Hangzhou, China, May 15-19, 2017.
Office Action from Taiwan Patent Office in correspondinge TW Application No. 107119724, dated May 8, 2019.

* cited by examiner

METHOD AND APPARATUS OF MULTIPLE SR (SCHEDULING REQUEST) CONFIGURATIONS IN A WIRELESS COMMUNICATION SYSTEM

CROSS-REFERENCE TO RELATED APPLICATIONS

The present application claims the benefit of U.S. Provisional Patent Application Ser. No. 62/516,801 filed on Jun. 8, 2017, the entire disclosure of which is incorporated herein in its entirety by reference.

FIELD

This disclosure generally relates to wireless communication networks, and more particularly, to a method and apparatus of multiple SR configurations in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes triggering a first scheduling request (SR) by a first logical channel (LCH), wherein the first LCH is associated with a first SR configuration. The method also includes triggering a second SR by a second LCH while the first SR is pending, wherein the second LCH is associated with a second SR configuration, and the first SR configuration and the second SR configuration are configured for the same serving cell. The method further includes using a first SR opportunity and a second SR opportunity to transmit SRs to a network node until the SRs are cancelled, wherein the first SR opportunity corresponds to the first SR configuration and the second SR opportunity corresponds to the second SR configuration.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: 3GPP email discussion, [98#35][NR/UP] Running TS 38.321 v0.0.4, NR MAC protocol specification; R2-1704001, "Report of 3GPP TSG RAN2 #97bis, Spokane, USA"; 3GPP RAN2 #98 Chairman's Note; TS 36.321 v14.2.1, "E-UTRA MAC protocol specification"; TS 36.331 v14.2.1, "E-UTRA RRC protocol specification"; and R2-1705625, "SR enhancements with multiple numerologies", Huawei and HiSilicon. The standards and documents listed above are hereby expressly incorporated by reference in their entirety.

Figure 1:
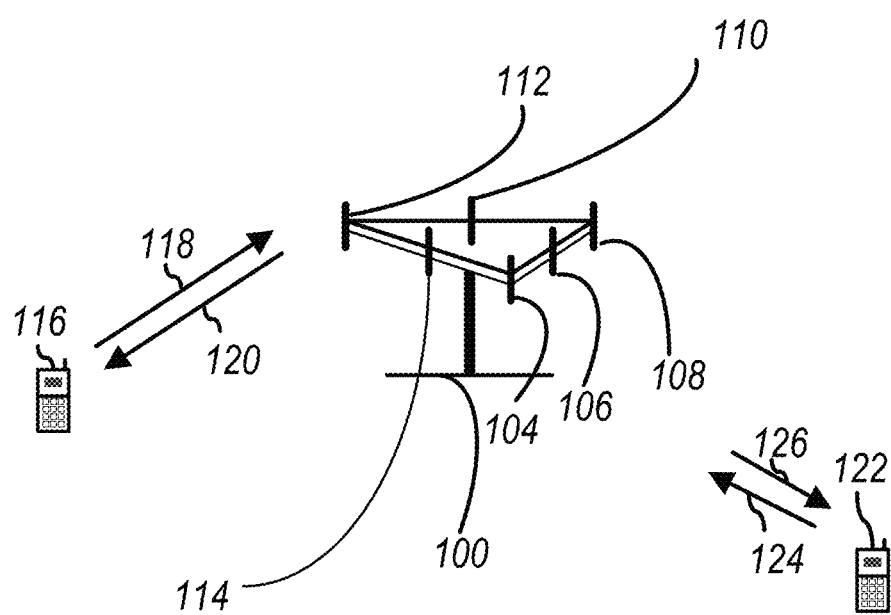
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
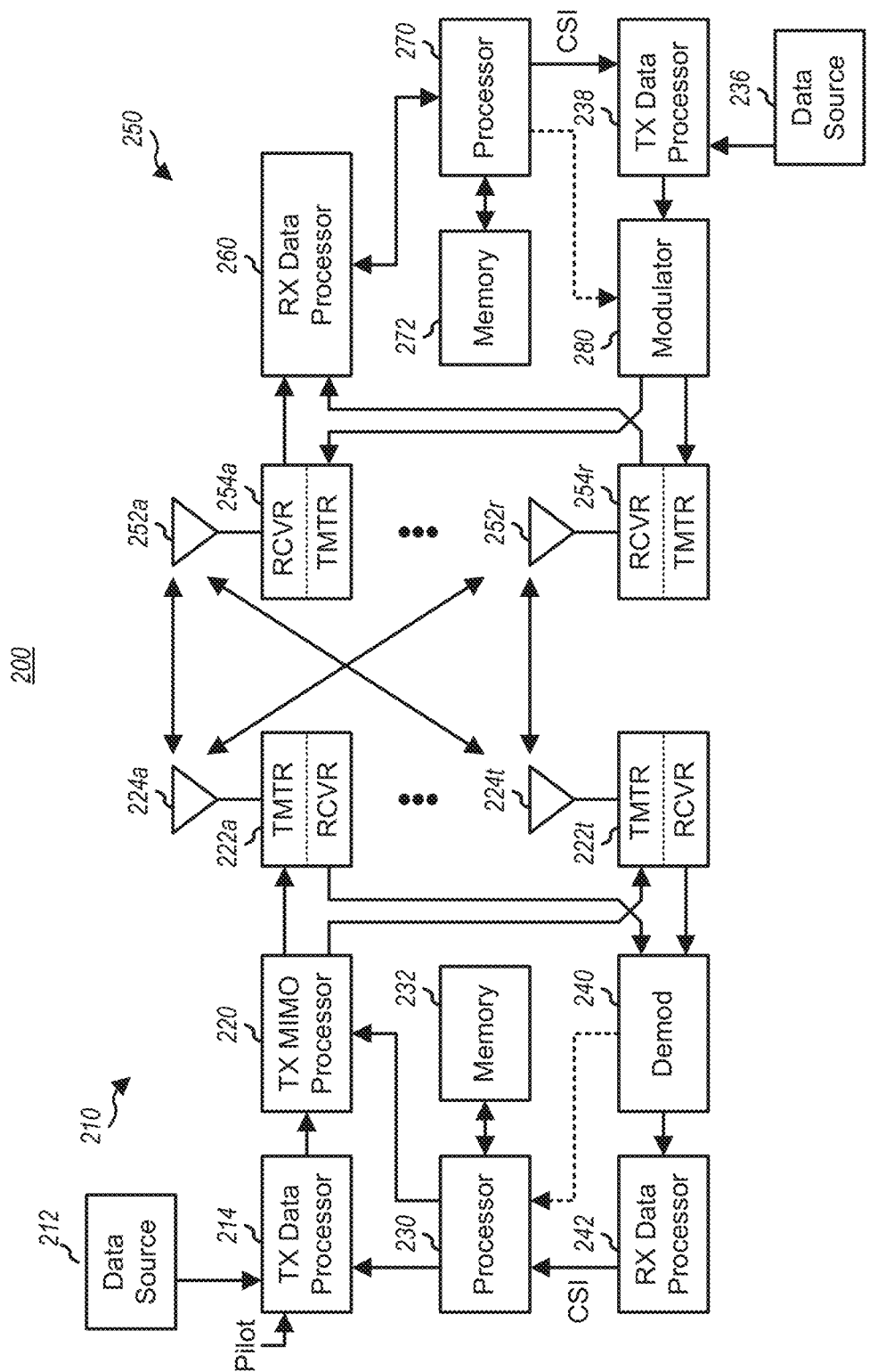
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
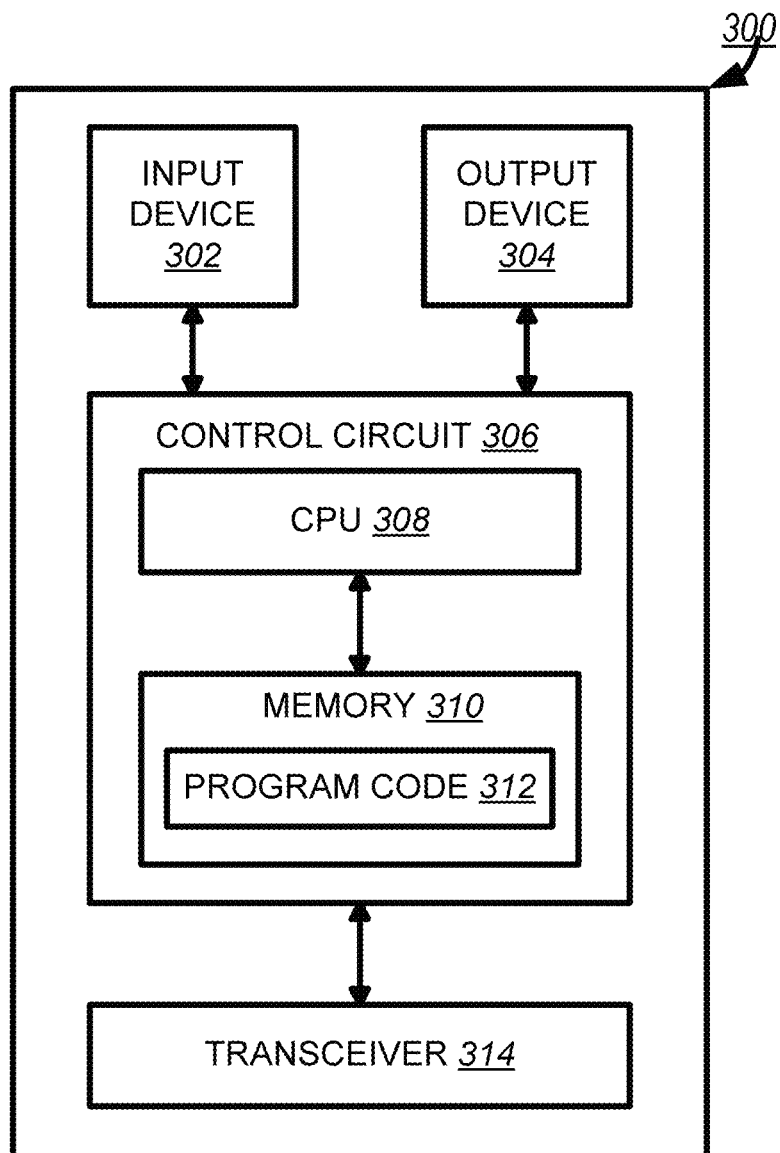
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
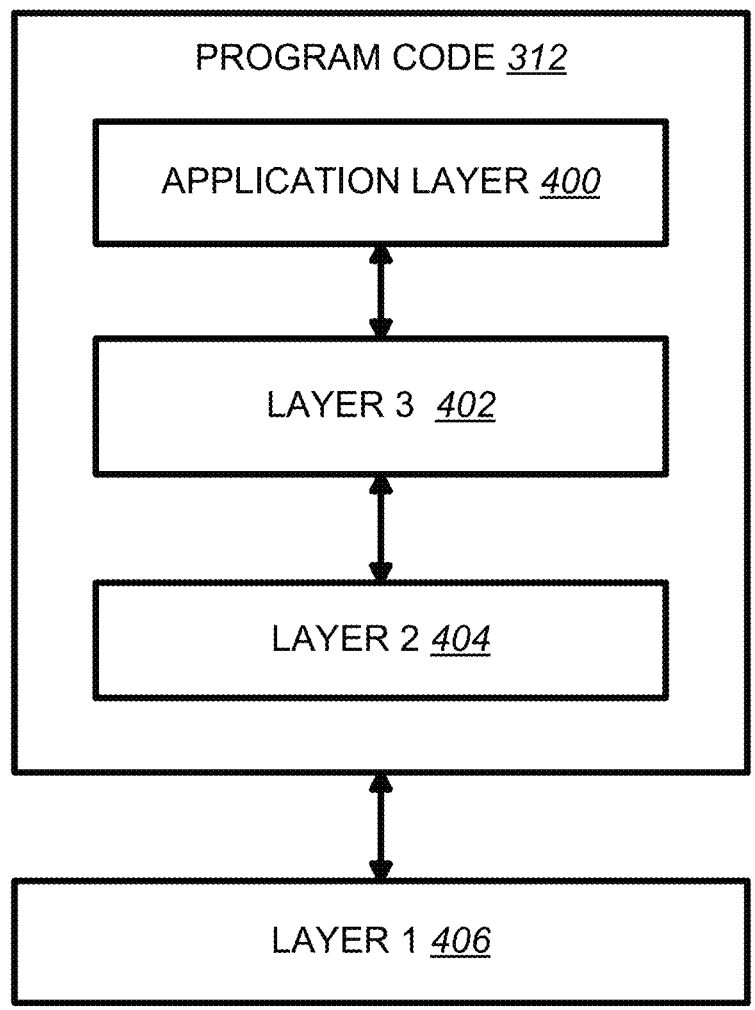
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020:
eMBB (enhanced Mobile Broadband)
mMTC (massive Machine Type Communications)
URLLC (Ultra-Reliable and Low Latency Communications).

New Radio (NR) access technology for 5G is currently under discussion and latest NR MAC specification can be found in 3GPP TS 38.321.

The current 3GPP agreement of NR SR is described in 3GPP R2-1704001 and 3GPP RAN2 #98 Chairman's Note as follows:
Agreements on SR/BSR
The SR should at least distinguish the "numerology/TTI type" of the logical channel that triggered the SR (how this is done is FFS).
The existing LTE BSR framework is used as baseline for NR BSR framework. Further enhancements at least related to numerologies and granularity and can be further discussed
Agreements
1. Multiple SR configurations can be configured to the UE and which SR configuration is used depends on the LCH that triggers the SR. The granularity of SR configuration for a logical channel is FFS.
NR Scheduling Request (SR) is described in 3GPP TS 38.321 as follows:
5.4.4 Scheduling Request
The Scheduling Request (SR) is used for requesting UL-SCH resources for new transmission. The MAC entity may be configured with zero or more SR configurations. Each SR configuration corresponds to one or more logical channels. Which SR configuration is used depends on the logical channel that triggers the SR.
Editor's note: Editor thinks zero is allowed (as in LTE), but RAN2 needs to confirm.
Editor's note: Editor thinks SR configuration can be mapped to multiple logical channels (i.e. 'one or more' above), but RAN2 needs to confirm.
RRC configures the following parameters for the scheduling request procedure:
sr-ProhibitTimer;
sr-TransMax;
sr-ConfigIndex.
Editor's note: PHY-related parameters (i.e. sr-ConfigIndex (and maybe more)) can be corrected later.
The following UE variables are used for the scheduling request procedure:
SR_COUNTER.
Editor's note: Editor thinks that the concept of SR_COUNTER and corresponding procedural text in LTE can be reused but procedural text is not captured yet. Note that if RAN2 considers having separate sr-ProhibitTimers and SR_COUNTER for each SR configuration, the text may need to be revised. It can be discussed in the future meetings.
LTE SR is described in 3GPP TS 36.321 as follows:
5.4.4 Scheduling Request
The Scheduling Request (SR) is used for requesting UL-SCH resources for new transmission.
When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or, if all pending SR(s) are triggered by Sidelink BSR, when a MAC PDU is assembled and this PDU includes a Sidelink BSR which contains buffer status up to (and including) the last event that triggered a Sidelink BSR (see subclause 5.14.1.4), or, if all pending SR(s) are triggered by Sidelink BSR, when upper layers configure autonomous resource selection, or when the UL grant(s) can accommodate all pending data available for transmission.

If an SR is triggered and there is no other SR pending, the MAC entity shall set the SR_COUNTER to 0.

As long as one SR is pending, the MAC entity shall for each TTI:
if no UL-SCH resources are available for a transmission in this TTI:
if the MAC entity has no valid PUCCH resource for SR configured in any TTI and if rach-Skip for the MCG MAC entity or rach-SkipSCG for the SCG MAC entity is not configured: initiate a Random Access procedure (see subclause 5.1) on the SpCell and cancel all pending SRs;
else if the MAC entity has at least one valid PUCCH resource for SR configured for this TTI and if this TTI is not part of a measurement gap or Sidelink Discovery Gap for Transmission and if sr-ProhibitTimer is not running:
if SR_COUNTER<dsr-TransMax:
increment SR_COUNTER by 1;
instruct the physical layer to signal the SR on one valid PUCCH resource for SR;
start the sr-ProhibitTimer.
else:
notify RRC to release PUCCH for all serving cells;
notify RRC to release SRS for all serving cells;
clear any configured downlink assignments and uplink grants;
initiate a Random Access procedure (see subclause 5.1) on the SpCell and cancel all pending SRs.
NOTE: The selection of which valid PUCCH resource for SR to signal SR on when the MAC entity has more than one valid PUCCH resource for SR in one TTI is left to UE implementation.
NOTE: SR_COUNTER is incremented for each SR bundle. sr-ProhibitTimer is started in the first TTI of an SR bundle.
LTE BSR (Buffer Status Report) triggering and SR triggering are described in 3GPP TS 36.321 as follows:
5.4.5 Buffer Status Reporting
The Buffer Status reporting procedure is used to provide the serving eNB with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an LCG [8].

For the Buffer Status reporting procedure, the MAC entity shall consider all radio bearers which are not suspended and may consider radio bearers which are suspended.

For NB-IoT the Long BSR is not supported and all logical channels belong to one LCG.

A Buffer Status Report (BSR) shall be triggered if any of the following events occur:
UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the MAC entity has data available for transmission for any of the logical channels which belong to a LCG, in which case the BSR is referred below to as "Regular BSR";

periodicBSR-Timer expires, in which case the BSR is referred below to as "Periodic BSR".

( . . . )

If the Buffer Status reporting procedure determines that at least one BSR has been triggered and not cancelled:
  if the MAC entity has UL resources allocated for new transmission for this TTI:
    instruct the Multiplexing and Assembly procedure to generate the BSR MAC control element(s);
    start or restart periodicBSR-Timer except when all the generated BSRs are Truncated BSRs;
    start or restart retxBSR-Timer.
  else if a Regular BSR has been triggered and logicalChannelSR-ProhibitTimer is not running:
    if an uplink grant is not configured or the Regular BSR was not triggered due to data becoming available for transmission for a logical channel for which logical channel SR masking (logicalChannelSR-Mask) is setup by upper layers:
      a Scheduling Request shall be triggered.

LTE configuration of SR in RRC (Radio Resource Control) is described in 3GPP TS 36.331 as follows:

```
-- ASN1START
MAC-MainConfig ::=                      SEQUENCE {
    ul-SCH-Config                       SEQUENCE {
        maxHARQ-Tx                      ENUMERATED {
                                            n1, n2, n3, n4, n5, n6, n7, n8,
                                            n10, n12, n16, n20, n24, n28,
                                            spare2, spare1}    OPTIONAL, -- Need ON
        periodicBSR-Timer               PeriodicBSR-Timer-r12 OPTIONAL, -- Need ON
        retxBSR-Timer                   RetxBSR-Timer-r12,
        ttiBundling                     BOOLEAN
    }                                                          OPTIONAL, -- Need ON
    drx-Config                          DRX-Config            OPTIONAL, -- Need ON
    timeAlignmentTimerDedicated         TimeAlignmentTimer,
    phr-Config                          CHOICE {
        release                             NULL,
        setup                               SEQUENCE {
            periodicPHR-Timer                   ENUMERATED {sf10, sf20, sf50, sf100, sf200,
                                                    sf500, sf1000, infinity},
            prohibitPHR-Timer                   ENUMERATED {sf0, sf10, sf20, sf50, sf100,
                                                    sf200, sf500, sf1000},
            dl-PathlossChange                       ENUMERATED {dB1, dB3, dB6, infinity}
        }
    }                                                          OPTIONAL, -- Need ON
    ...,
    [[ sr-ProhibitTimer-r9              INTEGER (0..7)        OPTIONAL -- Need ON
    ]],
-- ASN1START
SchedulingRequestConfig ::=             CHOICE {
    release                                 NULL,
    setup                                   SEQUENCE {
        sr-PUCCH-ResourceIndex                  INTEGER (0..2047),
        sr-ConfigIndex                          INTEGER (0..157),
        dsr-TransMax                            ENUMERATED {
                                                    n4, n8, n16, n32, n64, spare3, spare2,
                                                    spare1}
    }
}
SchedulingRequestConfig-v1020 ::=       SEQUENCE {
    sr-PUCCH-ResourceIndexP1-r10            INTEGER (0..2047)     OPTIONAL -- Need OR
}
SchedulingRequestConfigSCell-r13 ::=                CHOICE {
    release                                 NULL,
    setup                                   SEQUENCE {
        sr-PUCCH-ResourceIndex-r13              INTEGER (0..2047),
        sr-PUCCH-ResourceIndexP1-r13            INTEGER (0..2047)     OPTIONAL, - Need OR
        sr-ConfigIndex-r13                      INTEGER (0..157),
        dsr-TransMax-r13                        ENUMERATED {
                                                    n4, n8, n16, n32, n64, spare3, spare2,
                                                    spare1}
    }
}
-- ASN1STOP
```

In LTE, regardless of which LCH (Logical Channel) triggers the SR, the UE will send the same SR to eNB (evolved Node B). The SR merely indicates that there is higher priority data becoming available in UE's buffer, but the UE has no UL resource to send the data (or more precisely, the BSR for the data). Normally, the UE is configured with one SR resource while in eCA (enhanced Carrier Aggregation) mode there can be at most two SR resources configured to UE, where one SR is at PCell (Primary Cell) and the other is at PUCCH (Physical Uplink Control Channel) SCell (Secondary Cell). The two SR resources are not located at the same Cell (but belong to the same eNB). Therefore, their SR opportunities may overlap in time domain. If the two SR resources collide in the same TTI, the selection of which SR resource to signal SR is up to UE implementation. If not collided, the UE can use both of the SR resources to signal SR at any time. This means that both eNB and UE treat the two SRs the same. There is no relationship between the SR configuration and the LCH triggering the SR.

In NR, multiple SR resources (configurations) can be configured to the UE (for the same serving cell), and which SR configuration is used depends on the LCH that triggers the SR. The purpose of having multiple SR configurations is to facilitate network scheduling. Network can schedule proper UL resource (e.g., on proper numerology, with proper TTI length) that suits the UE need based on the received SR. The LCH that triggers the SR may be able to differentiate the service type that needs UL resources. Different service types have different QoS/requirements. Some services (e.g., URLLC (Ultra-Reliable and Low Latency Communications)) require lower latency, while others (e.g., eMBB (enhanced Mobile Broadband) do not. It is generally beneficial for gNB to know what service type triggers SR in UE side, so that gNB can provide proper UL resource for that service type sooner. Since this is different from LTE which both UE and eNB treat all SR configurations the same, there should be some rules for the UE to select proper SR configurations to signal SR.

In case of one LCH triggered SR, the UE should choose SR configuration for the LCH to signal SR. Since the correspondence between SR configuration and LCH is configured by gNB, gNB will understand which LCH triggered SR after receiving the SR signalled by UE.

In case of multiple LCHs triggered SR, if they correspond to the same SR configuration, the result is the same as single LCH case. But it is possible that the multiple LCHs correspond to different SR configurations. The case that multiple LCHs triggered SR is discussed in 3GPP R2-1705625 as follows:

There may be more than one LCHs that triggered the SR.
The SR could imply the "numerology/TTI type" of the logical channel with the highest priority that triggered the SR. With this information, at least the proper scheduling of the logical channel with the highest priority on the corresponding numerology/TTI type could be guaranteed.
Proposal 2: The SR should-Imply the "Numerology/TTI Type" of the Logical Channel with the Highest Priority that Triggered the SR.

Figure 5:
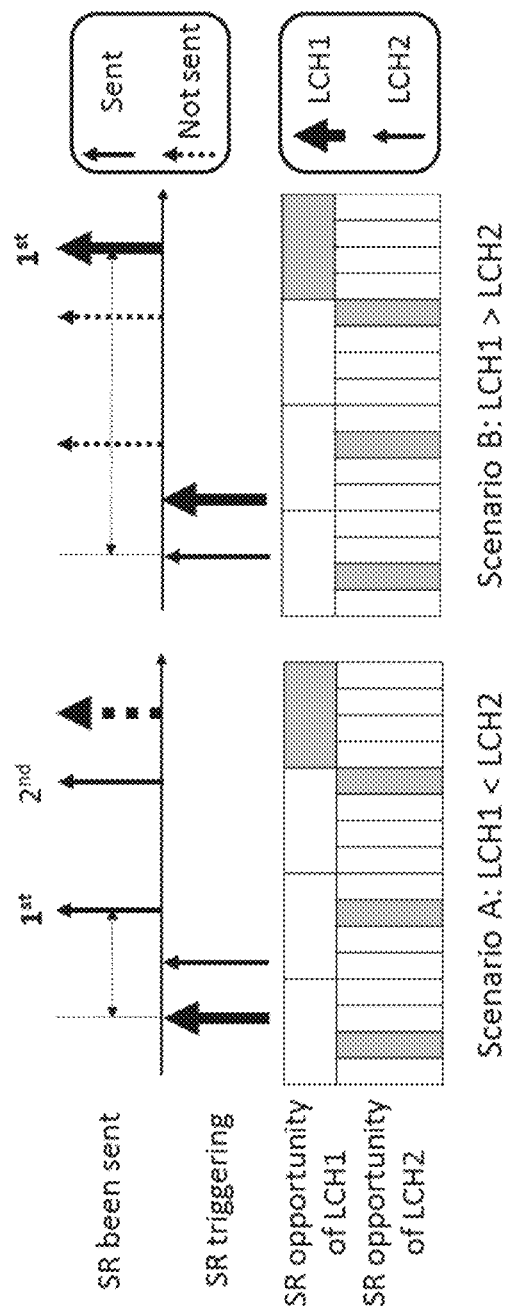
FIG. 5 is a timing diagram according to one exemplary embodiment.

For example, there are two LCHs and two SR configurations. One SR corresponds to one LCH, respectively. Based on the proposal discussed in 3GPP R2-1705625, if one LCH triggers SR first and the other LCH triggers SR later (which implies that the second LCH has higher priority than the first one), the UE can only use SR configuration for the second LCH to signal SR no matter which SR opportunity occurs first, as shown in FIG. 5. In particular, FIG. 5 illustrates an exemplary situation where the UE cannot signal SR as soon as possible.

Although this approach can guarantee the proper scheduling of the LCH with highest priority, it could cause some resource waste and delayed SR indication in some scenario such as the two LCHs triggering SR nearly at the same time. For example, in scenario B of FIG. 5, according to 3GPP R2-1705625, the first (and second) encountered SR opportunity is skipped because the SR is associated with lower priority LCH. One of the SR resources cannot be used based on 3GPP R2-1705625 even when it has been configured to the UE.

In summary, the key issue is that, only one LCH (and thus one SR configuration) will be selected based on the proposal in 3GPP R2-1705625, and it results in waste of PUCCH resource as UE can exploit only one of the SR configurations at any time. In addition, it is noted that higher priority does not always imply more delay-sensitive (e.g., the RRC message has the highest priority, but does not require low-latency). Therefore, the UE may not be able to obtain suitable UL resource for delivering the delay-sensitive message based on 3GPP R2-1705625.

Figure 6:
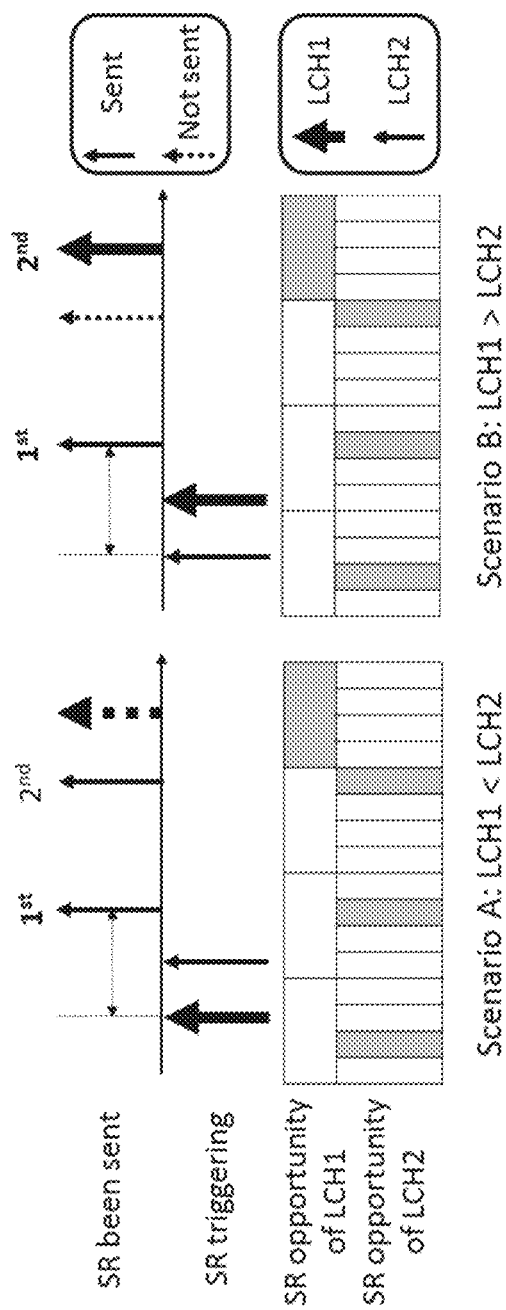
FIG. 6 is a timing diagram according to one exemplary embodiment.

To solve the issue, when a UE is configured with multiple SR configurations (for the same serving cell) and more than one LCH that triggers SR (where the more than one LCH is associated with more than one SR configuration), the UE should use the more than one SR configuration to signal the SR. At least the UE should signal SR as soon as possible, e.g., not skip the first encountered SR opportunity even if its associated LCH is not the highest priority LCH that triggered SR. One alternative is using the first encountered SR opportunity to signal SR anyway, and then switch back to the SR configuration corresponding to the highest priority LCH that triggered SR. Another alternative is using the SR configuration which has shortest period. By adopting one of the above two mentioned solutions, the first encountered SR opportunity in FIG. 6, scenario B will not be skipped. In particular, FIG. 6 shows an exemplary solution where UE can signal SR as soon as possible, but the UE cannot fully exploit all SR configurations (as illustrated in Scenario A). As illustrated in scenario A of FIG. 6, one SR configuration is used at any time in these two alternatives. There may be still some resource waste in the two alternatives.

Figure 7:
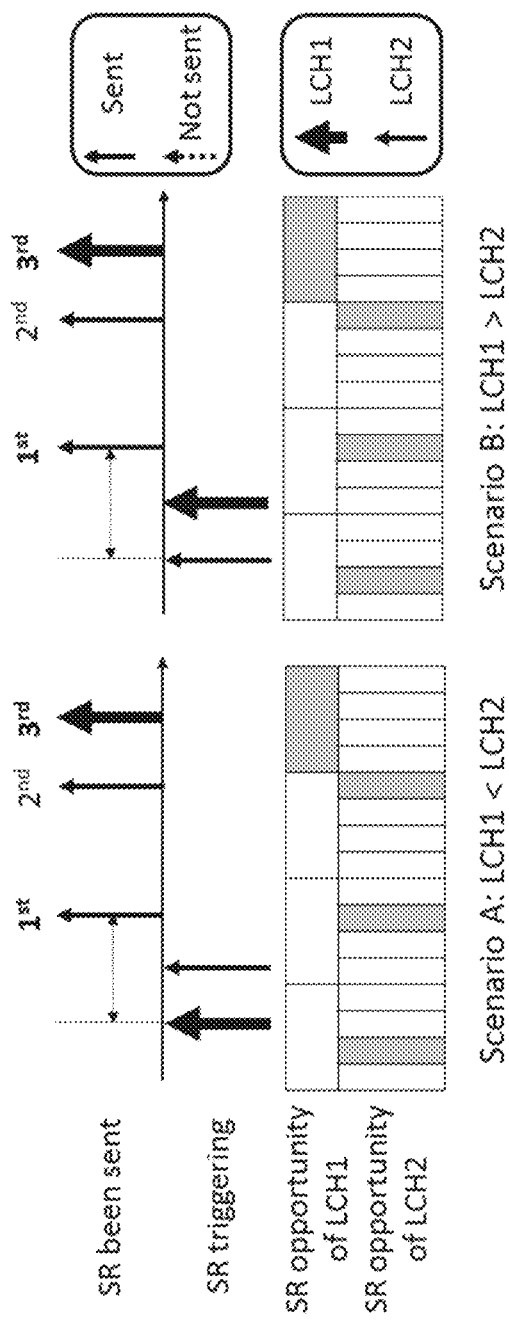
FIG. 7 is a timing diagram according to one exemplary embodiment.

Another alternative is that the UE can use both or all of the SR configurations to signal SR until the SR is canceled. By adopting this solution, not only the UE can signal the SR as soon as possible, but also the UE can fully exploit the PUCCH resources configured to it (as shown in FIG. 7). In particular, FIG. 7 shows an exemplary solution where the UE can signal SR as soon as possible, and can fully exploit all SR configurations. In addition, gNB will be aware of both LCHs after receiving both SRs. The information provided by the UE is helpful for gNB better scheduling the UE.

If multiple SR configurations can be used by the UE when SR is pending, it is possible that SR opportunity may collide in time domain. Because the UE may not have the ability to signal multiple SRs at the same time, the UE needs to determine which SR opportunity is used. In case two or more SR opportunities collide in the same TTI or partially overlap with each other (usually when their TTI lengths are different), there are alternatives as follows:
(1) The UE could use the first encountered SR opportunity. If they occur (start) at the same time, it could depend on the processing order of the UE or depend on gNB configuration.
(2) The UE could use the SR opportunity which will be the first one completely received by gNB (usually the one with shortest TTI length). If they will be completely received at the same time, it could depend on gNB configuration, or there is no restriction on which SR opportunity could be used.

(3) The combination of the above two. If both SR opportunities occur at the same time, the UE uses the SR opportunity which will be the first one completely received by gNB. If both SR opportunities will be completely received by gNB at the same time, the UE uses the first encountered SR opportunity. Otherwise, either SR opportunity could be used, depending on gNB configuration or there is no restriction on which SR opportunity could be used.

Figure 8:
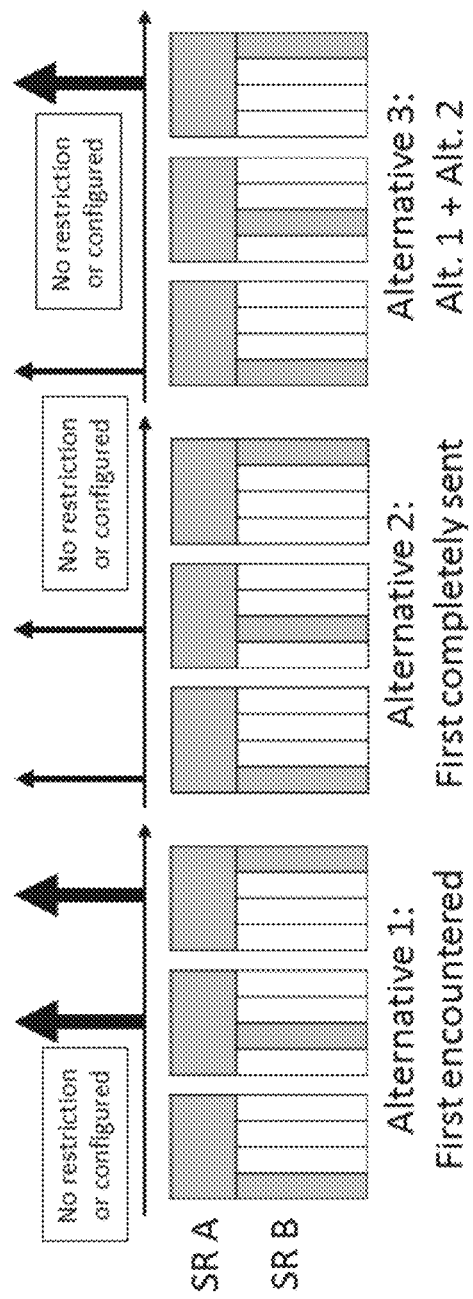
FIG. 8 is a timing diagram according to one exemplary embodiment.

The three alternatives are illustrated in FIG. 8. In particular, FIG. 8 illustrates an example of collided/overlapped SR opportunities and three alternatives to solve the issue. Although there are some possible alternatives for UE, additional cost may be introduced, especially when more than two SR opportunities collide. Different UEs may also have different UE behaviors. It is possible that gNB could prevent from configuring collided/overlapped SR resources to the UE. If the collision or overlapping is unavoidable (e.g., SR configuration for URLLC might have very short SR period), gNB should ensure that there are at most two SR resources collided/overlapped at any time, and which one is used can also be configured by gNB. For example, in case one of the overlapped SR configurations is for URLLC, it is reasonable that gNB will configure UE to use SR for URLLC prior to SR for other services. If the UE has the ability of transmitting two SRs at the same time (e.g., using two tx beams), gNB can allow this UE to signal both SRs when they are collided/overlapped.

In another aspect, in LTE, the SR prohibit timer is applied for short period SR configuration to avoid too frequent SR transmissions. For multiple SR configurations in NR, it is also beneficial to apply this timer. How the functionality of SR prohibit timer applies to multiple SR configurations in NR should be considered. One alternative is to apply separated SR prohibit timers for each SR configuration, and each prohibit timer can prohibit its corresponding SR configuration but not other SR configuration (as shown in FIG. 9).

Figure 9:
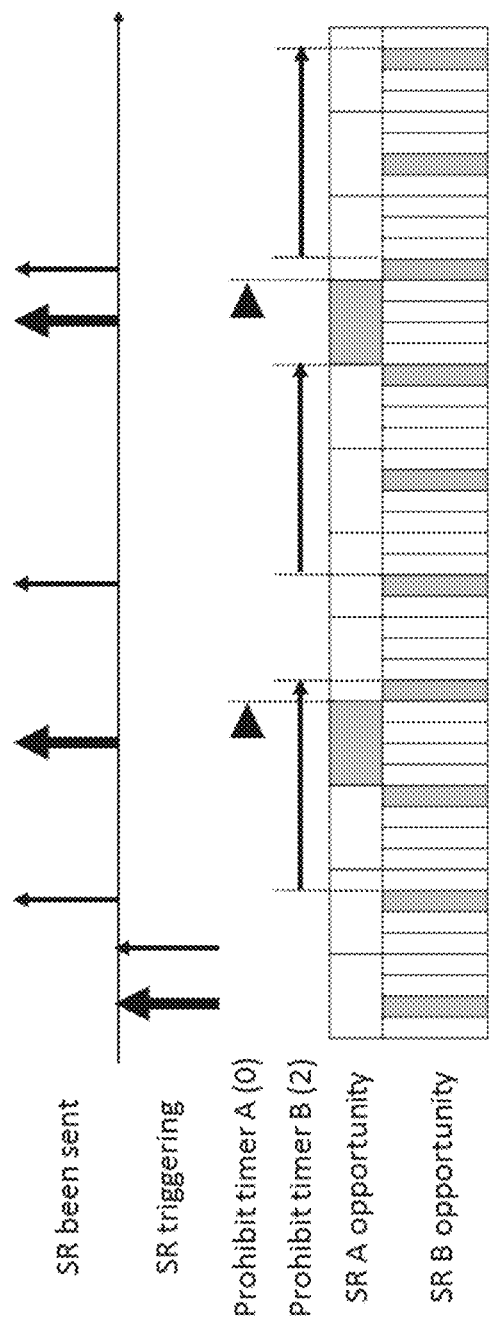
FIG. 9 is a timing diagram according to one exemplary embodiment.

FIG. 9 illustrates an example of a solution that separated SR prohibit timers are applied for each SR configuration. In FIG. 9, there are two prohibit timers, one for SR A (prohibiting zero SR period), and the other for SR B (prohibiting two SR periods). Upon SR opportunity for SR A, the UE could signal SR A no matter prohibit timer for SR B is running or not. But when prohibit timer for SR B is running, the UE should not signal SR B until the timer is expired. gNB is responsible for configuring proper timer value for each SR configuration. For example, the prohibit time can be zero or one SR period for URLLC, and the prohibit time can also be zero for eMBB in case the SR period is much longer (e.g., 10 ms). For this alternative, the timer value can be in SR periods as in LTE.

Figure 10:
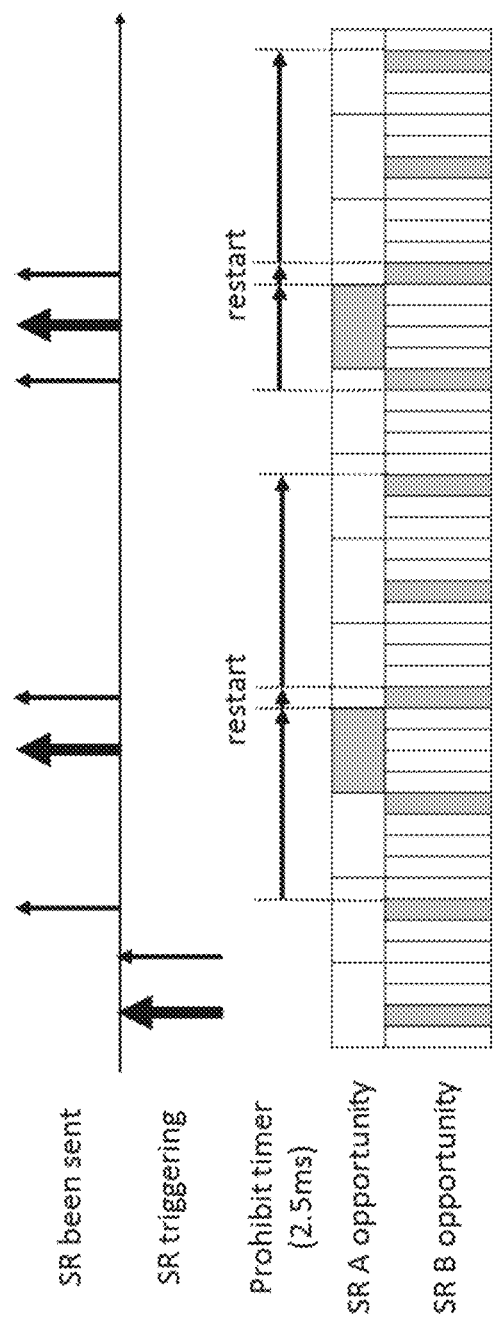
FIG. 10 is a timing diagram according to one exemplary embodiment.

Another alternative is to apply a single SR prohibit timer for multiple configured SR configurations. If SR A (re-)starts the timer, while the timer is running SR A should be prohibited but SR B should not. FIG. 10 shows an example of this alternative. When the timer is started by SR B, if the next occurred SR opportunity is still SR B, it should be prohibited; if the next occurred SR opportunity is SR A, it should not be prohibited. The timer may be restarted after SR A is signalled. For this alternative, the timer value may "not" be in SR periods if multiple SR configurations apply the same timer value. The single timer value may be in millisecond independent of which SR (re-)starts the timer, which implies a fixed prohibit time. For SRs with period longer than the timer value, this equals to no prohibit time since the timer is expired before the next SR opportunity occurs. But if the SR opportunity for another SR configuration occurs while the timer is running, the timer is restarted, and will no longer prohibit SR for the first SR configuration since the timer is "overridden" by the second SR configuration. It is also possible that not all SR configurations need SR prohibit timer. For SR configurations with long period (e.g., SR for eMBB/mMTC), there is no need to apply SR prohibit timer. For URLLC, to ensure low latency and high reliability, it is possible that gNB will configure zero prohibit time for its corresponding SR. Thus, each SR configuration could be configured to apply or not to apply the timer. A new information element per SR configuration in RRC could be defined to achieve this.

Figure 11:
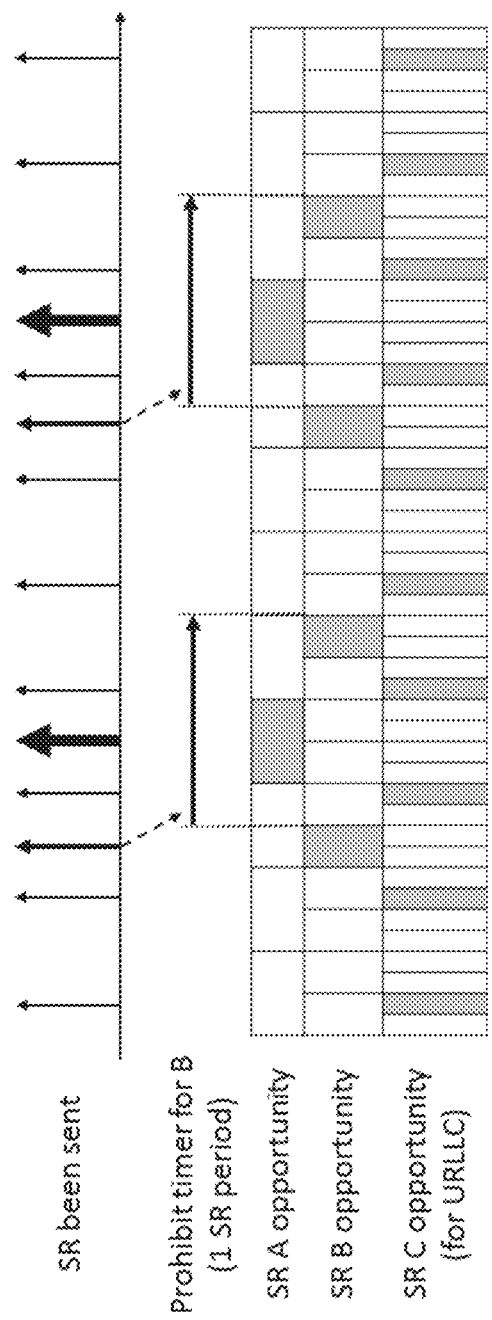
FIG. 11 is a timing diagram according to one exemplary embodiment.

A special case of the above alternative is that, at most one prohibit timer is configured and is applied to at most one specific SR configuration. gNB could configure and specify which SR configuration the prohibit timer is applied to. FIG. 11 illustrates an example of a solution that a single SR prohibit timer is applied for a specific SR configuration. As shown in FIG. 11, a UE has 3 SR configurations, and only the second one needs SR prohibit timer. In this alternative, a new information element in RRC is defined (e.g., in MAC_MainConfig in case the prohibit timer is still per-MAC, or in SchedulingRequestConfig in case the prohibit timer is changed to per-Cell). The newly defined information element could be an index which points to the second SR configuration in this example. A maximum number of SR configurations is also predefined and fixed (e.g., up to 4). For this solution, the timer value can be in SR periods as in LTE. This simple solution introduces less complexity to UE as compared to multiple timers or single timer applied to more than one SR configurations.

If the condition of SR triggering no longer considers LCH priority, the multiple SRs together could inform gNB about which LCH(s)/LCG(s) have data available for transmission. The relaxation of SR triggering can further help the gNB better scheduling the UE.

In LTE, SR_COUNTER is used to prevent from the situation that UE has signalled SR many times but does not receive any UL grant. This is usually due to UL transmission problem, including inaccurate UL power and inaccurate UL timing alignment. In NR, the UE may have multiple SR configurations, which will be received by the same cell (or even the same TRP/beam). If one of them encounters UL transmission problem, usually the others will also do. As a result, there is no need to have separated SR_COUNTER for each SR configuration. But only one SR_COUNTER might be too restricted in case UE has URLLC services. SR for URLLC will have very short period, so the SR_COUNTER reaches dsr-TransMax much faster in a short time.

Another solution is that, there are at most two SR_COUNTERs and two corresponding dsr-TransMax, one for URLLC services and the other one for all non-URLLC services. For example, when the UE signals the SR using SR configuration(s) associated with LCH(s) for URLLC, the UE should use the SR_COUNTER and dsr-TransMax for URLLC. When the UE signals the SR using SR configuration(s) associated with LCH(s) for other services, the UE should use another SR_COUNTER and another dsr-TransMax which is not for URLLC. gNB is responsible for configuring proper dsr-TransMax for them, according to the SR configurations configured to the UE.

Figure 12:
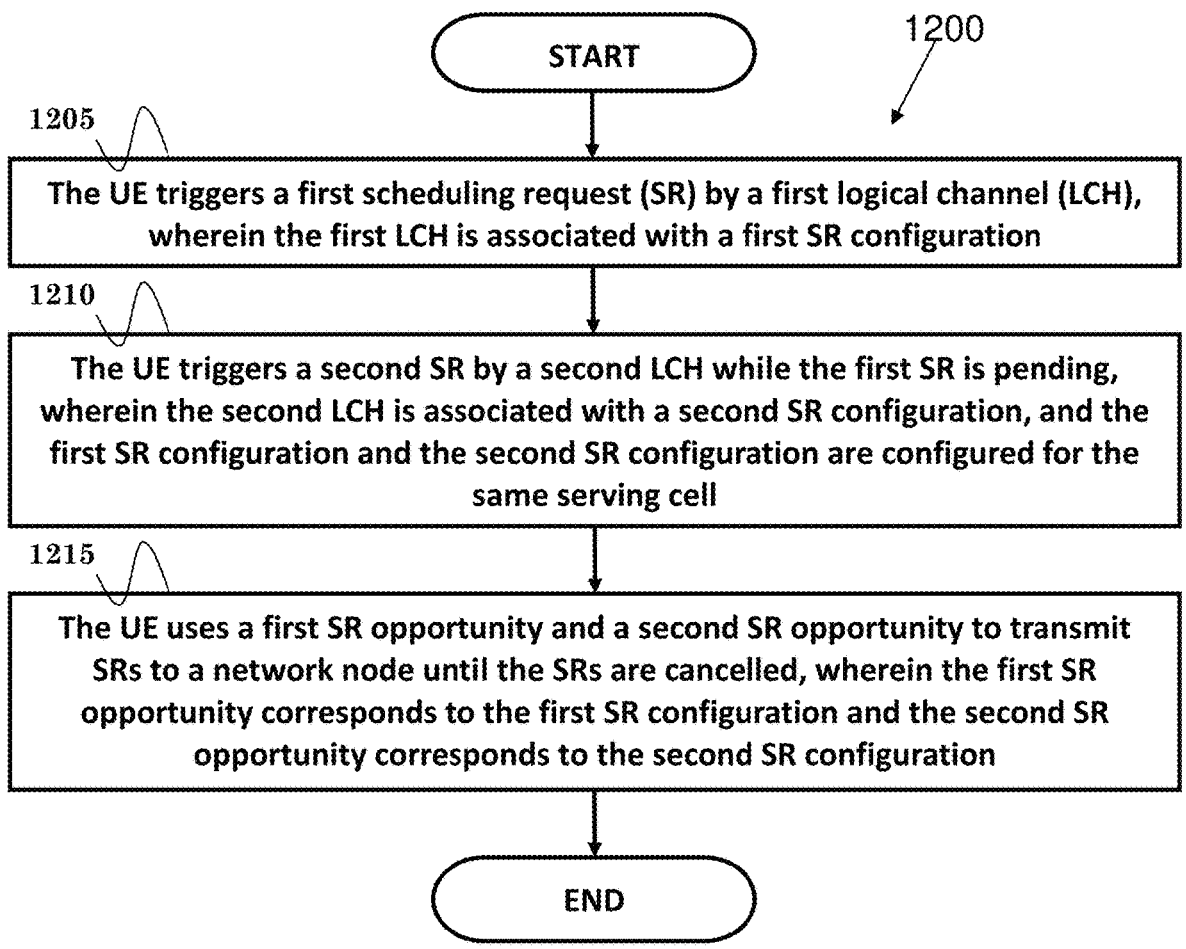
FIG. 12 is a flow chart according to one exemplary embodiment.

FIG. 12 is a flow chart 1200 according to one exemplary embodiment of a UE. In step 1205, the UE triggers a first scheduling request (SR) by a first logical channel (LCH), wherein the first LCH is associated with a first SR configuration. In step 1210, the UE triggers a second SR by a second LCH while the first SR is pending, wherein the second LCH is associated with a second SR configuration, and the first SR configuration and the second SR configuration are configured for the same serving cell. In step 1215, the UE uses a first SR opportunity and a second SR opportunity to transmit SRs to a network node until the SRs are cancelled, wherein the first SR opportunity corresponds to the first SR configuration and the second SR opportunity corresponds to the second SR configuration.

In one embodiment, the SR opportunity could be an opportunity where the UE has valid PUCCH (Physical Uplink Control Channel) resources for SR, and the PUCCH resources for SR could be configured under a specific SR configuration.

In one embodiment, the UE could receive a configuration from a network node for configuring the SR configuration. The UE could also receive a configuration from a network node for configuring the association between the LCH and the SR configuration. The association could be based on an index, and the index points to the SR configuration.

In one embodiment, the network node could be a gNB. Furthermore, after an SR is triggered, the SR could remain pending until it is cancelled. In addition, the SR could be triggered by the LCH when a regular BSR is triggered by the LCH, and the UE does not have any UL (Uplink) resource valid for the LCH. The UL resource would be valid for a LCH when the UL resource satisfies the restriction of UL resource for the LCH. The restriction of UL resource could be related to the numerology and/or TTI of the UL resource. The restriction of UL resource for a LCH could also be configured by network, such as via a RRC (Radio Resource Control) signalling.

Referring back to FIGS. 3 and 4, in one exemplary embodiment of a UE, the device 300 includes a program code 312 stored in the memory 310. The CPU 308 could execute program code 312 to enable the UE (i) to trigger a first SR by a first LCH, wherein the first LCH is associated with a first SR configuration, (ii) to trigger a second SR by a second LCH while the first SR is pending, wherein the second LCH is associated with a second SR configuration, and the first SR configuration and the second SR configuration are configured for the same serving cell, and (iii) to use a first SR opportunity and a second SR opportunity to transmit SRs to a network node until the SRs are cancelled, wherein the first SR opportunity corresponds to the first SR configuration and the second SR opportunity corresponds to the second SR configuration. Furthermore, the CPU 308 can execute the program code 312 to perform all of the above-described actions and steps or others described herein.

Figure 13:
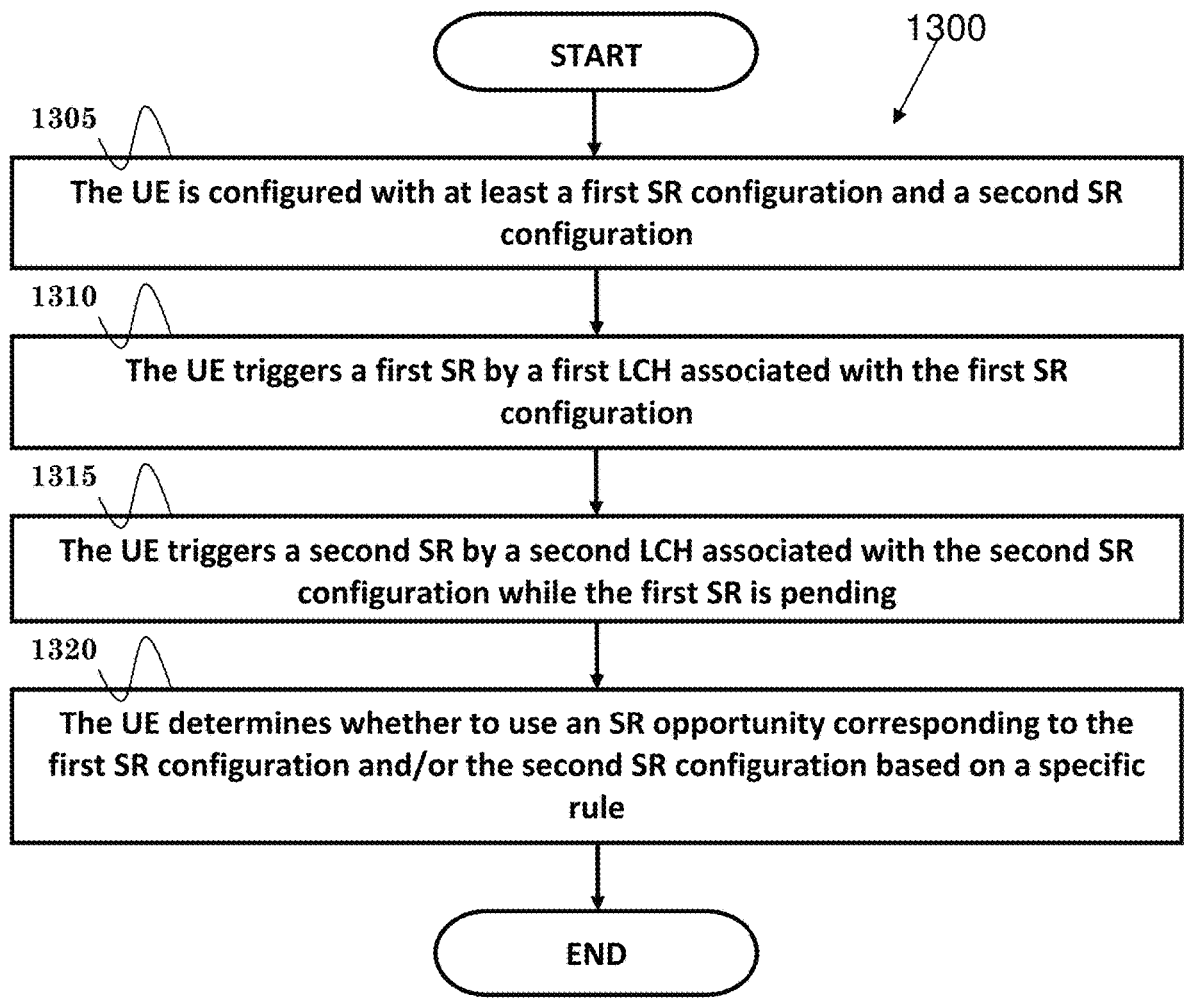
FIG. 13 is a flow chart according to one exemplary embodiment.

FIG. 13 is a flow chart 1300 according to one exemplary embodiment of a UE. In step 1305, the UE is configured with at least a first SR configuration and a second SR configuration. In step 1310, the UE triggers a first SR by a first LCH associated with the first SR configuration. In step 1315, the UE triggers a second SR by a second LCH associated with the second SR configuration while the first SR is pending. In step 1320, the UE determines whether to use an SR opportunity corresponding to the first SR configuration and/or the second SR configuration based on a specific rule.

Referring back to FIGS. 3 and 4, in one exemplary embodiment of a UE, the device 300 includes a program code 312 stored in the memory 310. The CPU 308 could execute program code 312 to enable the UE (i) to be configured with at least a first SR configuration and a second SR configuration, (ii) to trigger a first SR by a first LCH associated with the first SR configuration, (iii) to trigger a second SR by a second LCH associated with the second SR configuration while the first SR is pending, and (iv) to determine whether to use an SR opportunity corresponding to the first SR configuration and/or the second SR configuration based on a specific rule. Furthermore, the CPU 308 can execute the program code 312 to perform all of the above-described actions and steps or others described herein.

Figure 14:
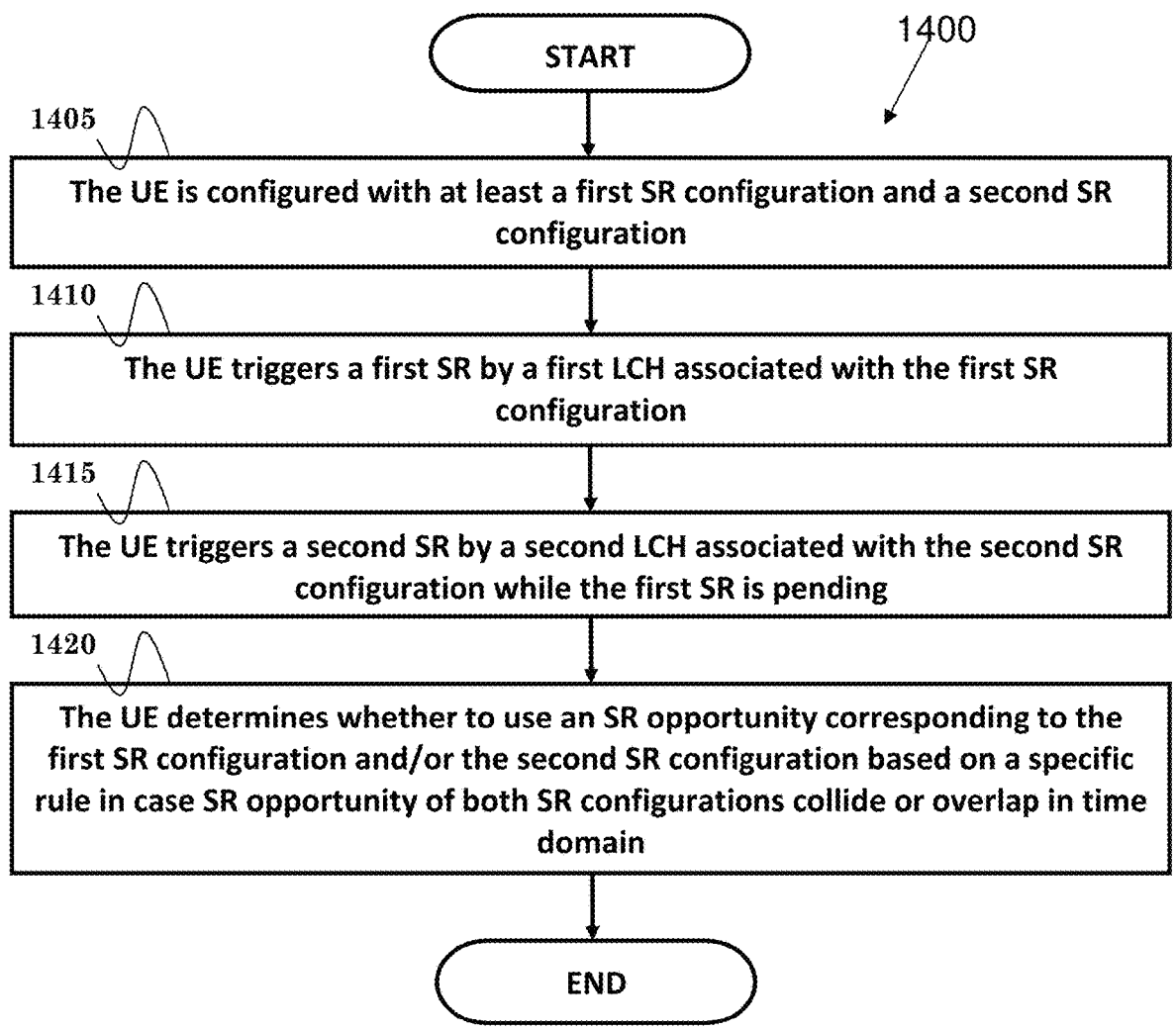
FIG. 14 is a flow chart according to one exemplary embodiment.

FIG. 14 is a flow chart 1400 according to one exemplary embodiment of a UE. In step 1405, the UE is configured with at least a first SR configuration and a second SR configuration. In step 1410, the UE triggers a first SR by a first LCH associated with the first SR configuration. In step 1415, the UE triggers a second SR by a second LCH associated with the second SR configuration while the first SR is pending. In step 1420, the UE determines whether to use an SR opportunity corresponding to the first SR configuration and/or the second SR configuration based on a specific rule in case SR opportunity of both SR configurations collide or overlap in time domain.

Referring back to FIGS. 3 and 4, in one exemplary embodiment of a UE, the device 300 includes a program code 312 stored in the memory 310. The CPU 308 could execute program code 312 to enable the UE (i) to be configured with at least a first SR configuration and a second SR configuration, (ii) to trigger a first SR by a first LCH associated with the first SR configuration, (iii) to trigger a second SR by a second LCH associated with the second SR configuration while the first SR is pending, and (iv) to determine whether to use an SR opportunity corresponding to the first SR configuration and/or the second SR configuration based on a specific rule in case SR opportunity of both SR configurations collide or overlap in time domain. Furthermore, the CPU 308 can execute the program code 312 to perform all of the above-described actions and steps or others described herein.

Figure 15:
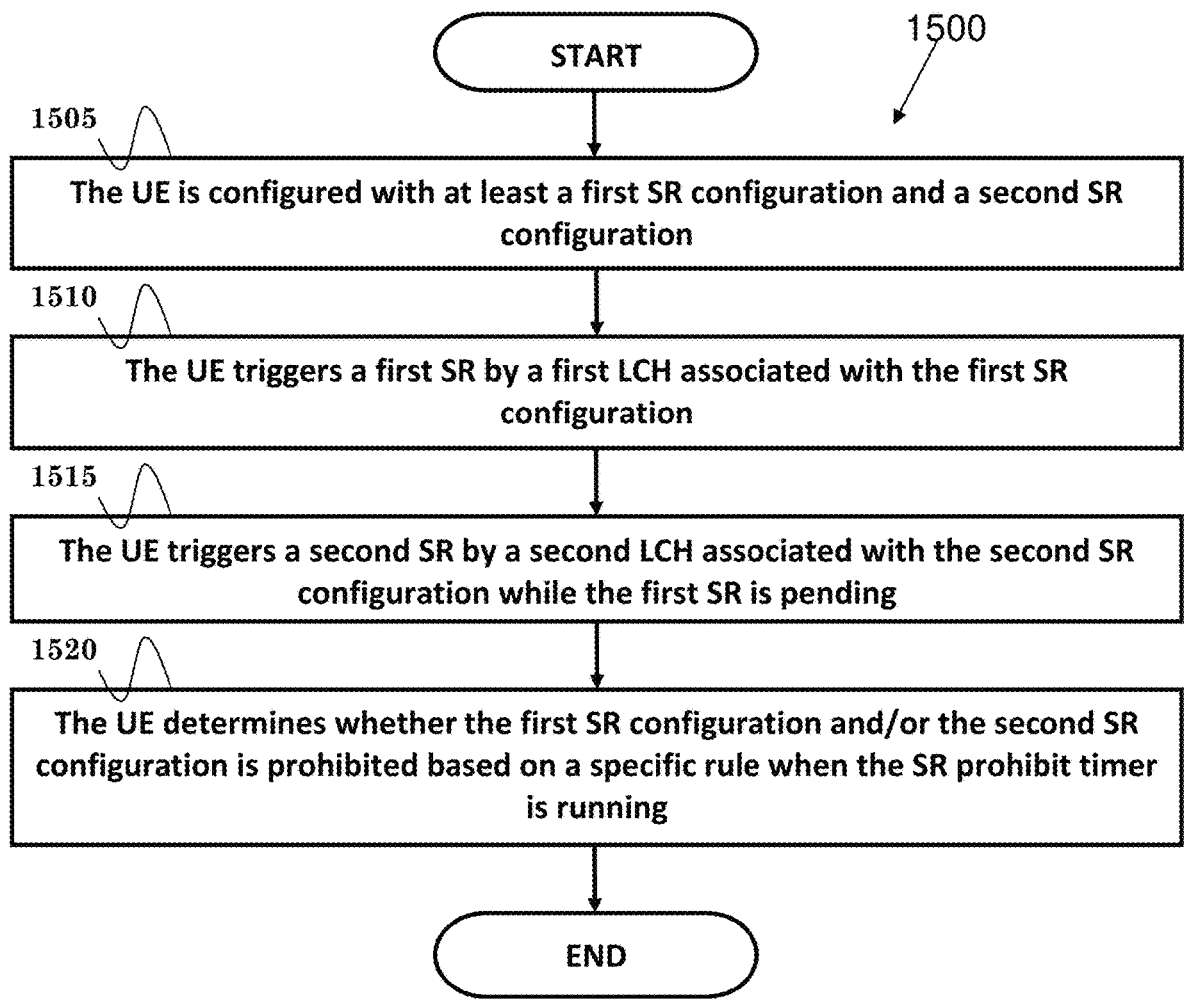
FIG. 15 is a flow chart according to one exemplary embodiment.

FIG. 15 is a flow chart 1500 according to one exemplary embodiment of a UE. In step 1505, the UE is configured with at least a first SR configuration and a second SR configuration. In step 1510, the UE triggers a first SR by a first LCH associated with the first SR configuration. In step 1515, the UE triggers a second SR by a second LCH associated with the second SR configuration while the first SR is pending. In step 1520, the UE determines whether the first SR configuration and/or the second SR configuration is prohibited based on a specific rule when the SR prohibit timer is running.

Referring back to FIGS. 3 and 4, in one exemplary embodiment of a UE, the device 300 includes a program code 312 stored in the memory 310. The CPU 308 could execute program code 312 to enable the UE (i) to be configured with at least a first SR configuration and a second SR configuration, (ii) to trigger a first SR by a first LCH associated with the first SR configuration, (iii) to trigger a second SR by a second LCH associated with the second SR configuration while the first SR is pending, and (iv) to determine whether the first SR configuration and/or the second SR configuration is prohibited based on a specific rule when the SR prohibit timer is running. Furthermore, the CPU 308 can execute the program code 312 to perform all of the above-described actions and steps or others described herein.

In the context of the embodiments shown in FIGS. 13-15 and described in the text above, in one embodiment, the specific rule could be using the SR opportunity corresponding to the SR configuration with shortest SR period, or using the SR opportunities corresponding to the first SR configuration and the second SR configuration. Furthermore, the SR opportunity could either correspond to the first SR configuration or the second SR configuration. In addition, the SR configuration with shortest SR period could be either the first SR configuration or the second SR configuration.

The specific rule could also be using the first encountered SR opportunity. If multiple SR opportunities occur at the same time, there is no restriction on which one is used. Alternatively, if multiple SR opportunities occur at the same time, the RRC configuration could be used to determine which SR opportunity should be used.

Furthermore, the specific rule could be to using the SR opportunity which is first completely received by the network node. If multiple SR opportunities are completely received at the same time, there is no restriction on which one is used. Alternative, if multiple SR opportunities are completely received at the same time, the RRC configuration could be used to determine which SR opportunity should be used.

In addition, the specific rule could be using the first encountered SR opportunity. If multiple SR opportunities occur at the same time, the UE could use the SR opportunity which is first completely received by the network node to signal the SR. If the SR opportunities do not meet the above two conditions, there is no restriction on which one is used. Alternatively, if the SR opportunities do not meet the above two conditions, the RRC configuration could be used to determine which SR opportunity should be used.

In one embodiment, the specific rule could be using the SR configuration based on RRC configuration. The SR opportunity could either correspond to the first SR configuration or the second SR configuration. If the UE has the ability to signal multiple SRs at the same time, the UE could signal one or multiple SRs based on RRC configuration. If a network prevents multiple SR configurations from colliding or overlapping at the same time, there could be no specific rule on the UE side.

In one embodiment, the specific rule could be if the timer is (re-)started by the first SR configuration, the second SR configuration is not prohibited; and if the timer is (re-)started by the second SR configuration, the first SR configuration is not prohibited. In addition, if the timer is (re-)started by the first SR configuration, the SR signalling of the second SR configuration could restart the timer in case the second SR configuration applies the timer. And if the timer is (re-)started by the second SR configuration, the SR signalling of the first SR configuration could restart the timer in case the first SR configuration applies the timer. Furthermore, if an SR configuration does not apply SR prohibit timer, it does not restart the timer after an SR associated with the SR configuration is signalled.

In one embodiment, the timer value could be configured by the network, e.g., via a RRC signalling. The timer value should not be in SR periods in case multiple SR configurations apply the same value. The timer value could be in millisecond or microsecond, irrespective of which SR configuration (re-)starts the timer, in case multiple SR configurations apply the same value. The timer value could also be in SR periods in case at most one SR configuration applies the timer.

In one embodiment, after an SR is triggered, the SR is pending until it is cancelled. Furthermore, the network configures (e.g., via a RRC signalling) which SR configuration a LCH associated to. The association between a LCH and an SR configuration could be based on the numerology and/or TTI of the LCH. The association between a LCH and an SR configuration could also be based on an index or a profile.

In one embodiment, the UE could use an SR opportunity to signal SR as long as at least one SR is pending. The SR opportunity could be an opportunity where the UE has valid SR resource in a TTI (Transmission Time Interval). The SR resource could be PUCCH resource(s) for the SR under a specific SR configuration. The SR configuration could be configured by the network, e.g., via a RRC signalling. The UE could be configured with one or more than one SR configuration.

In one embodiment, when the SR configuration is released by the network or by the UE itself, the SR resource corresponding to the SR configuration may no longer be valid. The SR configuration could include frequency domain related configurations (e.g., numerology, frequency offset). The SR configuration could also include time domain related configurations (e.g., periodicity, or subframe, slot, or mini-slot offset).

In one embodiment, the SR signalling could be a transmission of the SR where the UE is the transmitting side. The SR signalling could also be a transmission of the SR where the network is the receiving side.

In one embodiment, an SR is triggered by a LCH if a regular BSR is triggered by a LCH and the UE does not have any UL resource for the UL transmission. Alternatively, an SR is triggered by a LCH if a regular BSR is triggered by a LCH and the UE does not have any UL resource valid for the LCH.

In one embodiment, an UL resource is valid for a LCH when the UL resource satisfies the restriction of UL resource for the LCH. The restriction of UL resource could be related to the numerology and/or TTI of the UL resource. The restriction of UL resource for a LCH could be configured by the network, e.g. via a RRC signalling.

In one embodiment, a regular BSR is triggered by a LCH when (i) UL data for the LCH which belongs to a LCG (Logical Channel Group), becomes available for transmission, and (ii) either the data belongs to the LCH with higher priority than the priorities of the LCHs which belong to any LCG and for which data is already available for transmission, or there is no data available for transmission for any of the LCHs which belong to a LCG.

In one embodiment, a regular BSR is triggered by a LCH when UL data for the LCH which belongs to a LCG, becomes available for transmission. Alternatively, a regular BSR is triggered by the LCH when UL data for a certain LCH which belongs to a LCG, becomes available for transmission. The certain LCH could be configured by the network, e.g. via a RRC signalling.

In one embodiment, the SR prohibit timer could be configured by the network, e.g., via a RRC signalling. Furthermore, the SR prohibit timer is specific to a MAC entity (e.g., per-MAC) or to a cell (e.g., per-Cell). In addition, the SR prohibit timer could be applied to at most one SR configuration, to at least one SR configuration, or to more than one SR configuration. The network could configure (e.g., via a RRC signalling) which SR configuration(s) apply or do not apply the prohibit timer.

In one embodiment, after the UE signals an SR, the UE should start the SR prohibit timer in case this SR is associated with an SR configuration that applies the prohibit timer. In addition, after the UE signals an SR, the UE should not start the SR prohibit timer in case this SR is associated with an SR configuration that does not apply the prohibit timer.

In one embodiment, when the SR prohibit timer is running, at least one SR configuration which applies the prohibit timer is prohibited. Furthermore, when the SR prohibit timer is not running or expired, no SR configuration is prohibited. In addition, when an SR configuration is prohibited, the UE should not use any SR opportunity corresponding to this SR configuration to signal SR.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), comprising:
triggering a first scheduling request (SR) by a first logical channel (LCH), wherein the first LCH is associated with a first SR configuration;
triggering a second SR by a second LCH while the first SR is pending, wherein the second LCH is associated with a second SR configuration, and the first SR configuration and the second SR configuration are configured for the same serving cell; and
using a first SR opportunity and a second SR opportunity to transmit SRs to a network node until the SRs are cancelled, wherein the first SR opportunity corresponds to the first SR configuration and the second SR opportunity corresponds to the second SR configuration, wherein at least one of the first SR or the second SR is triggered in response to a regular BSR (Buffer Status Report) being triggered by the first LCH or the second LCH, and the UE has a UL-SCH (Uplink Shared Channel) resource that is available for transmitting the regular BSR, and wherein the UL-SCH resource is not valid for the first LCH or the second LCH which triggers the regular BSR.

2. The method of claim 1, wherein the SR opportunity is an opportunity where the UE has valid PUCCH (Physical Uplink Control Channel) resource for SR, and the PUCCH resource for SR is configured under a specific SR configuration.

3. The method of claim 1, wherein the UE receives the configuration from a network node for configuring the SR configuration.

4. The method of claim 1, wherein the UE receives the configuration from a network node for configuring the association between the LCH and the SR configuration.

5. The method of claim 4, wherein the association is based on an index, and the index points to the SR configuration.

6. The method of claim 1, wherein the network node is a gNB.

7. The method of claim 1, wherein after an SR is triggered, the SR is pending until the SR is cancelled.

8. The method of claim 1, wherein a restriction of UL-SCH resource is related to the numerology and/or TTI of the UL-SCH resource, and the restriction of UL-SCH resource for a LCH is configured by network via a RRC (Radio Resource Control) signalling.

9. The method of claim 1, wherein the UL-SCH resource is not valid for the first LCH or the second LCH if the UL-SCH resource does not satisfy a restriction of UL-SCH resource for the first LCH or the second LCH.

10. A User Equipment (UE), comprising:
a control circuit;
a processor installed in the control circuit; and
a memory installed in the control circuit and operatively coupled to the processor;
wherein the processor is configured to execute a program code stored in the memory to:
trigger a first scheduling request (SR) by a first logical channel (LCH), wherein the first LCH is associated with a first SR configuration;
trigger a second SR by a second LCH while the first SR is pending, wherein the second LCH is associated with a second SR configuration, and the first SR configuration and the second SR configuration are configured for the same serving cell; and
use a first SR opportunity and a second SR opportunity to transmit SRs to a network node until the SRs are cancelled, wherein the first SR opportunity corresponds to the first SR configuration and the second SR opportunity corresponds to the second SR configuration, wherein at least one of the first SR or the second SR is triggered in response to a regular BSR (Buffer Status Report) being triggered by the first LCH or the second LCH, and the UE has a UL-SCH (Uplink Shared Channel) resource that is available for transmitting the regular BSR, and wherein the UL-SCH resource is not valid for the first LCH or the second LCH which triggers the regular BSR.

11. The UE of claim 10, wherein the SR opportunity is an opportunity where the UE has valid PUCCH (Physical Uplink Control Channel) resource for SR, and the PUCCH resource for SR is configured under a specific SR configuration.

12. The UE of claim 10, wherein the UE receives a configuration from the network node for configuring the SR configuration.

13. The UE of claim 10, wherein the UE receives a configuration from the network node for configuring the association between the LCH and the SR configuration.

14. The UE of claim 13, wherein the association is based on an index, and the index points to the SR configuration.

15. The UE of claim 10, wherein the network node is a gNB.

16. The UE of claim 10, wherein after an SR is triggered, the SR is pending until the SR is cancelled.

17. The UE of claim 10, wherein a restriction of UL-SCH resource is related to the numerology and/or TTI of the UL-SCH resource, and the restriction of UL-SCH resource for a LCH is configured by network via a RRC (Radio Resource Control) signalling.

18. The UE of claim 10, wherein the UL-SCH resource is not valid for the first LCH or the second LCH if the UL-SCH resource does not satisfy a restriction of UL-SCH resource for the first LCH or the second LCH.

* * * * *